INVENTOR.
Jacob W. Castrow
BY Gerald Altman

Dec. 17, 1957 J. W. CASTROW 2,816,458
VARIABLE SPEED DEVICES
Filed July 22, 1953 5 Sheets-Sheet 3

INVENTOR.
Jacob W. Castrow
BY Gerald Altman

Dec. 17, 1957  J. W. CASTROW  2,816,458
VARIABLE SPEED DEVICES

Filed July 22, 1953  5 Sheets-Sheet 4

INVENTOR.
Jacob W. Castrow
BY Gerald Altman

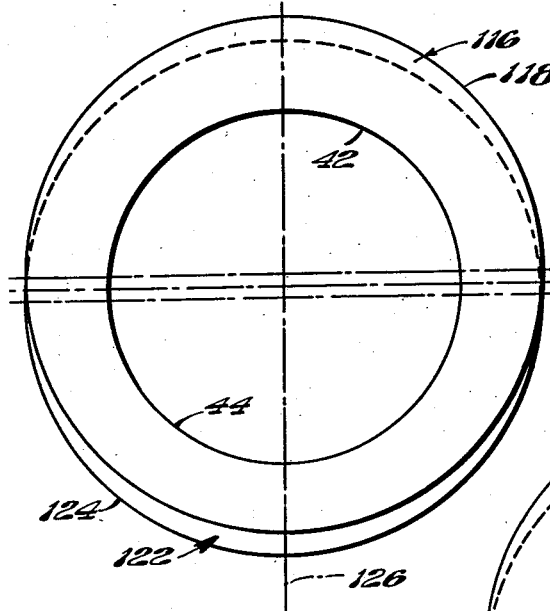
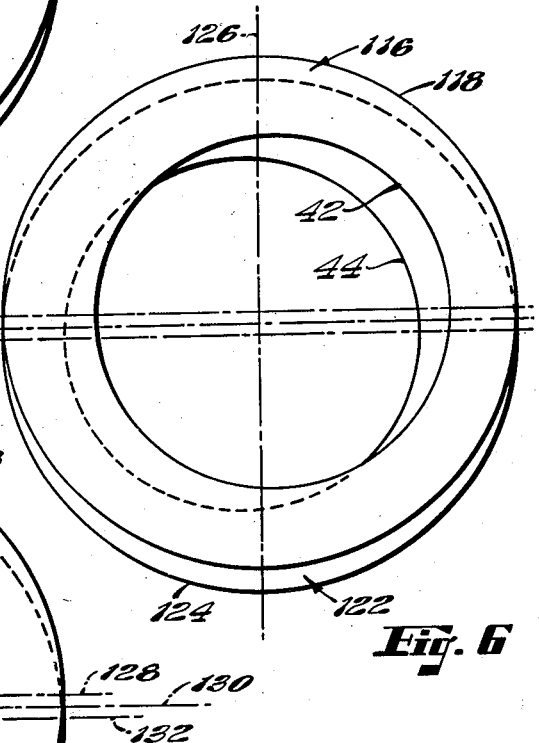
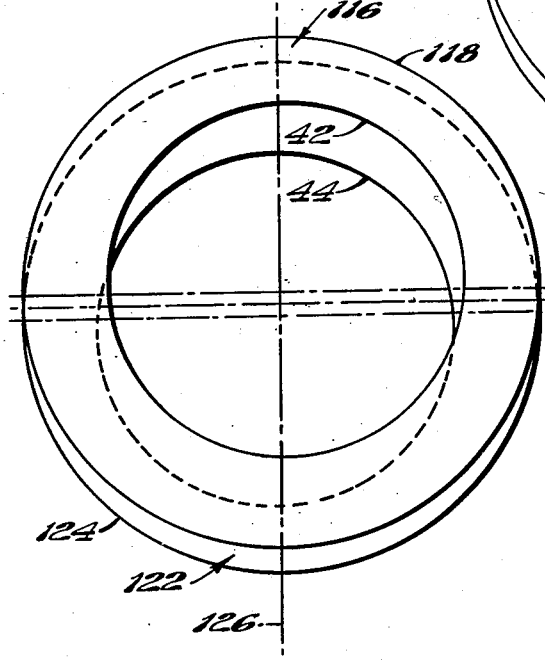

United States Patent Office 2,816,458
Patented Dec. 17, 1957

2,816,458

VARIABLE SPEED DEVICES

Jacob W. Castrow, Waltham, Mass., assignor of one-third to Gerald Altman, Cambridge, Mass.

Application July 22, 1953, Serial No. 369,573

14 Claims. (Cl. 74—679)

The present invention relates to variable speed devices and, more particularly, to novel devices of the type having an input-output speed ratio which is infinitely variable within a predetermined range and an input-output coupling which is positive for all input-output speed ratios within this range.

Objects of the present invention are: to provide novel variable speed devices having one or more of the following features; components which are in substantial dynamic balance; an input-output speed ratio which is readily adjustable; an efficiency which is of the same order as that of direct gearing; heavy duty sturdiness; and components which are few in number and simple in operation.

Other objects of the present invention are: to provide a variable speed device, possessing one or more of the foregoing features, in which power is transmitted from an input yoke rotatable about a primary axis to an output shaft by rocker arms which are carried by the yoke, by races which are followed by the rocker arms and which are so adjustable that their axes may be fixed between positions coincident with and spaced from the primary axis, and by one-way clutches which are in torque-receiving association with the rocker arms and in torque-transmitting association with the output shaft; to provide a variable speed device of the foregoing type in which the races are so adjustable as to maintain the rocker arms in substantial dynamic balance; to provide, for use in a variable speed device of the foregoing type, a ring having an inner profile which constitutes a race and an outer profile which is eccentric to the inner profile, whereby rotation of the ring about the axis of the outer profile causes the axis of the inner profile to move between positions coincident with and spaced from the primary axis; and to provide a variable speed device which possesses one or more of the foregoing features and which comprises a base, yoke means mounted for rotation on the base and adapted to receive an input torque, one-way clutch means mounted for rotation on the yoke means, eccentric means adjustably mounted on the base, actuating means operatively connecting the one-way clutch means and the eccentric means, and ouput means mounted for rotation on the base and operatively connected to the clutch means.

Still other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figs. 5, 6 and 7 are profile views of two eccentric rings, which the device comprises, as they would appear from the right end of the device as oriented in Fig. 1, in three of their infinite variety of relative positions.

Figure 1:
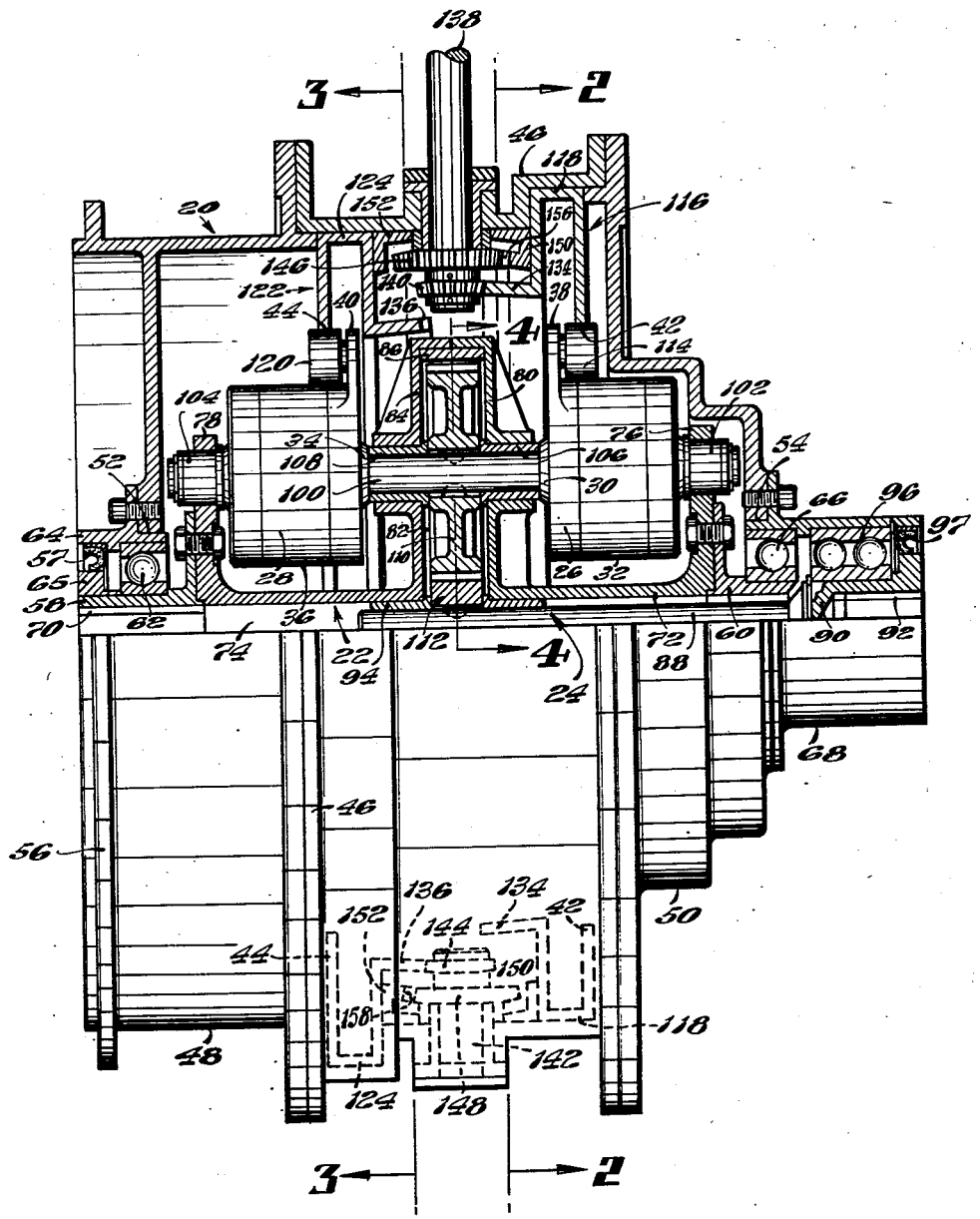
Figure 1 is a broken away, partly sectional elevation of a variable speed device embodying the present invention.

The herein described embodiment of the present invention comprises elements of the following type and operates in the following manner. Mounted for rotation about a primary axis in a suitable housing is a yoke to which an input torque may be applied. An output shaft mounted for rotation in the housing, preferably for rotation about the primary axis, is driven by the yoke through a plurality of one-way clutches each of which includes an inner member and an outer member rotatable with respect to each other. One, ordinarily the inner, member of each one-way clutch is mounted for rotation on the yoke and, thus, also for orbital motion about the primary axis. This member, further, is operatively connected, by such means as gearing, to the output shaft. The other, ordinarily the outer, member of each one-way clutch is operatively connected to an actuating member, for example, is secured to a rocker arm. The rocker arm follows a race which is adjustable so that its axis may be varied between positions coincident with and spaced from the primary axis. When the race axis is spaced from the primary axis, the rocker arm, following the race by reason of rotation of the yoke, causes the outer member of the clutch to oscillate and, thereby, to drive the inner member intermittently and unidirectionally. A sufficient number of rocker arms and clutches are provided to assure that at least one inner member is driven at any given time and, thereby, that the output shaft is driven continuously. The amplitude of the oscillations of the rocker arms and, therefore, the amplitude of the oscillations of the outer members of the clutches and the rotational speed of the output shaft are dependent on the distance between the race axis and the primary axis. Means are provided for varying this distance readily.

The embodiment of the present invention specifically illustrated in the accompanying drawings will now be described, like numerals referring to like parts. Mounted for rotation, about what may be termed a primary axis, in a suitable housing 20 is a yoke 22 to which an input torque may be applied. Power is transmitted from yoke 22 to an output shaft 24 through two sets of one-way clutches 26 and 28, four in each set. Clutches 26 include inner and outer members 30 and 32 and clutches 28 include inner and outer members 34 and 36, the inner members being mounted for rotation on yoke 22 and being geared to output shaft 24 Secured to outer members 32 and 34, respectively, are two sets of generally outwardly extending (with reference to the primary axis) rocker arms 38 and 40, four in each set, which, respectively, follow two races 42 and 44. When yoke 22 is caused to rotate, each of rocker arms 38 and 40 is caused by the race which it follows to oscillate and, thereby, to drive the inner member of the clutch with which it is associated intermittently and unidirectionally. One-way clutches 26 and 28 are so arranged that when yoke 22 is being driven, at least one inner member 30 and at least one inner member 34 are being driven at any given time. Consequently, output shaft 24 is being driven continuously. The distances between the axes of races 42 and 44 and the axis of yoke 22, and, consequently, the input-output speed ratio are readily adjustable. Excellent dynamic balance of these components is achieved by maintaining the axes of races 42 and 44 equidistant from and on diametrically opposite sides of the axis of yoke 22 so that dynamic unbalances created by rocker arms 38 are substantially equal and opposite to those created by rocker arms 40.

Housing 20, which mounts and encloses the components of the illustrated device, as viewed in Fig. 1 includes a generally tubular medial casting 46, a generally cup-shaped end casting 48 secured to the left end of the medial casting, and a generally bell-shaped end casting 50 secured to the right end of the medial casting. End castings 48 and 50 are centrally apertures at 52 and 54, respectively. Housing 20 may be secured to the housing of a motor by a mounting rim 56 which is integral with end casting 48.

A pair of hollow stub shafts 58 and 60, which are secured to the opposite ends of yoke 22, mount it for rotation within housing 20. Stub shaft 58 is journaled in a bearing 62 which is secured to end casting 48 by a mounting cap 64. Stub shaft 60 is journaled in a bearing 66 which is secured to end casting 50 by a mounting cap 68. Stub shaft 58, internally keyed at 70, is adapted to be driven by the output shaft of a motor with which the device is associated. An adaptor 65, secured to stub shaft 58, and a seal 57 prevent the escape of lubricants from within housing 20 through mounting cap 64.

Yoke 22 includes a hollow longitudinal portion 72 defining a longitudinal cavity 74 (Fig. 1), the longitudinal axis of which coincides with the primary axis. Yoke 22 further includes, at its opposite ends, a pair of substantially square mounting plates 76 and 78 and, midway between its ends, a ribbed frame 80 which defines a disk-shaped cavity 82 communicating with longitudinal cavity 74. Yoke 22 is fabricated from two similar castings joined at 84 and aligned by a ring 86 to which both castings are secured.

Output shaft 24 includes a solid portion 88 extending into longitudinal cavity 74 and a hollow end 90 internally keyed at 92 which may be connected to the input shaft of a device to be driven. Output shaft 24 is mounted for rotation about the primary axis, solid portion 88 being journaled at 94 by such means as bronze bushings or needle bearings, and hollow portion 90 being journaled in a bearing 96 which is secured to mounting cap 68. A seal 97 prevents the escape of lubricants from within housing 20 through mounting cap 68.

Clutches 26 and 28 are mounted for rotation on yoke 22 and for circular orbital motion about the primary axis by means of four shafts 100 to which inner members 30 and 34 are secured. Shafts 100 (Fig. 1), by such means as bronze bushings or needle bearings, are trunnioned in mounting plates 76 and 78 at 102 and 104 and are journaled in the opposed sections of frame 80 at 106 and 108. The axes of shafts 100 are parallel to and equidistant from the yoke axis. The arrangement is such that one each of inner members 34 and one each of inner members 30 are secured to one each of shafts 100.

Figure 2:
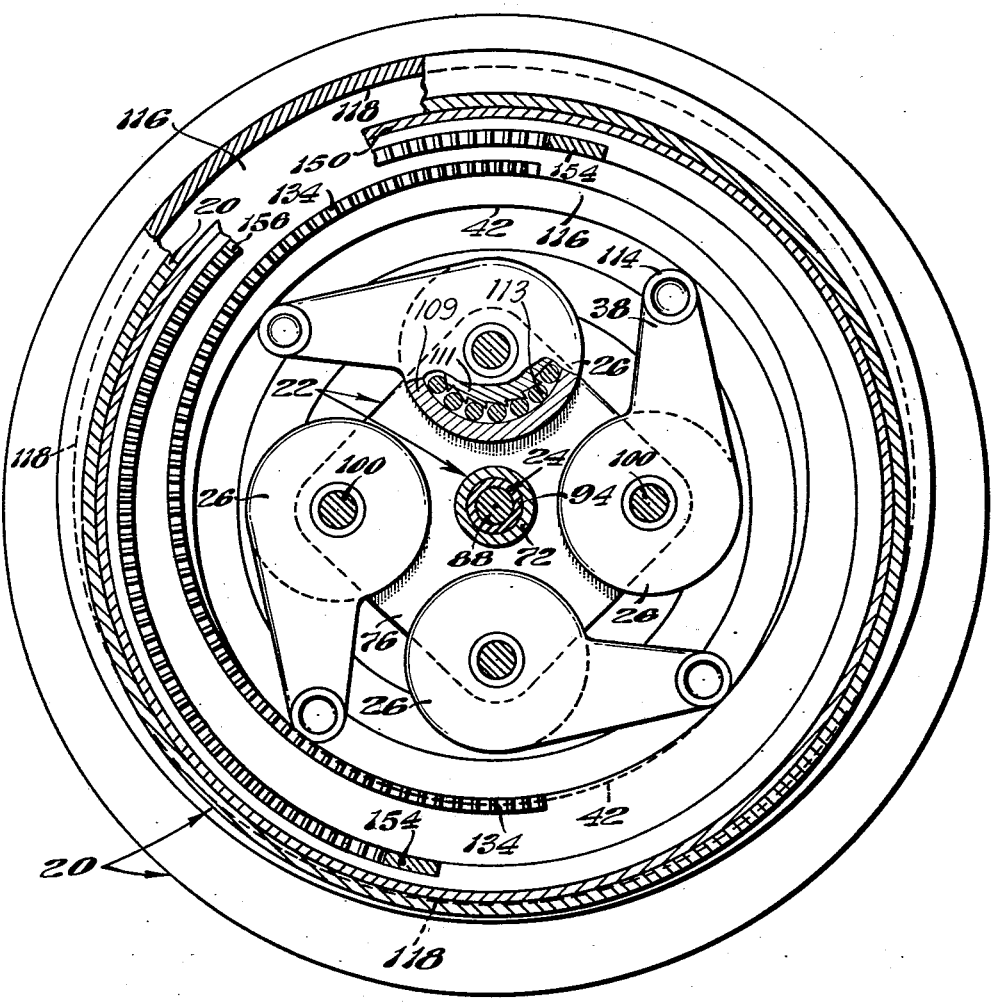
Fig. 2 is a cross-sectional view of the device taken substantially along the line 2—2 of Fig. 1.

In one form, as shown in Fig. 2 the clutches are of the roller type having an outer race 109, an inner cam 111 and rollers 112 which wedge between the race and the cam when the race is driven in one direction and which roll freely between the race and the cam when the race is driven in the other direction. In another form, the clutches are of the sprag type having smooth inner and outer races and sprags so shaped as to wedge between the races when the outer race is driven in one direction and to ride freely between the races when the outer race is driven in the other direction. In still another form, the clutches are of the magnetic type having input and output members and an electromagnetic control system which locks the members when the input member is driven in one direction and unlocks the members when the input member is driven in the other direction. In one example of a clutch of the magnetic type, the electromagnetic control system includes a magnetizeable fluid which interconnects the input and output members.

Figure 4:
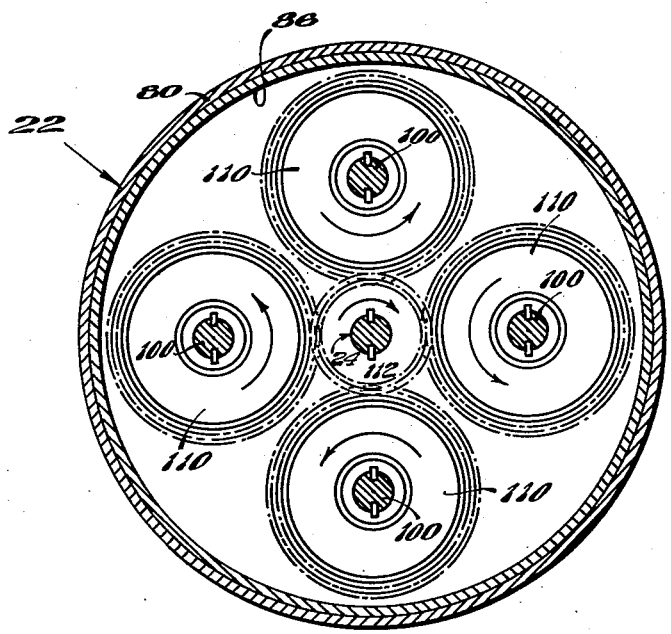
Fig. 4 is a cross-sectional view of the device taken substantially along the line 4—4 of Fig. 1.

Races 42 and 44, circular in profile, by virtue of which power is transmitted from yoke 22 through clutches 26 and 28 to shafts 100, when the yoke, as viewed in Fig. 2, rotates in a clockwise direction, are described in detail below. Power is transmitted (Fig. 4) from shafts 100 to output shaft 24 through four planet gears 110, one each of which is keyed to one each of shafts 100, and thence through a sun gear 112, which is meshed with the planet gears and keyed to the output shaft.

As yoke 22 rotates, arms 38 are constrained to follow race 42 by centrifugal force and by four rollers 114, one each of which is mounted on one each of the arms. If the axis of race 42 is coincident with the primary axis, arms 38 move in an orbit about the primary axis but do not pivot about the axes of shafts 100. If on the other hand the axis of race 42 is spaced from the yoke axis, arms 38 move in an orbit about the yoke axis and, additionally, oscillate about the axes of shafts 100, a single rotation of yoke 22 being accompanied by a single oscillation of each of arms 38. As arms 38 oscillate, outer members 32 oscillate and inner members 30 rotate intermittently and unidirectionally. A plurality of clutches 26 and arms 38 are provided so that at least one of shafts 100 rotates at any given time and output shaft 24 to which they are geared rotates continuously.

The amplitude of the oscillatory motion of arms 38 and, consequently, the input-output speed ratio are varied, as indicated above, as the distance between the axis of race 42 and the primary axis is varied. This is achieved by means of an eccentric ring 116, the inner profile of which constitutes race 42 and the outer profile 118 of which is seated for rotation in medial casting 46. The axis of outer profile 118 is spaced from the yoke axis a predetermined distance. The axis of race 42 is spaced from the axis of outer profile 118 the same distance. Thus, as ring 116 is rotated about the axis of outer profile 118, the axis of race 42 is moved between positions coincident with and spaced from the primary axis.

Similarly, as yoke 22 rotates, arms 40 are constrained to follow race 44 by centrifugal force and by four rollers 120, one each of which is mounted on one each of the arms. The distance between the axis of race 44 and the axis of yoke 22 is varied by means of an eccentric ring 122, the inner profile of which constitutes race 44 and the outer profile 124 of which is seated for rotation in medial casting 46. Race 44 and outer profile 124 of ring 122 are respectively similar, in dimension and relative position, to race 42 and outer profile 118 of ring 116.

The illustrated device is in excellent dynamic balance at all times, notwithstanding the oscillatory motion of arms 38 and 40, by reason of the following structural relationships. The axes of outer profile 118 and outer profile 124 are equidistant from and on diametrically opposite sides of the yoke axis. Rings 116 and 122, in a manner to be described below, are so interconnected as to rotate at once through the same angles in the same directions. The two sets of arms 38 and 40 move substantially in planes which are in close proximity. As a consequence, whatever the input-output speed ratio, the dynamic forces created by arms 38 and the dynamic forces created by arms 40 substantially balance each other.

Various rotational positions of rings 116 and 122, as they would appear from the right end of the device as oriented in Fig. 1, are shown in Figs. 5, 6 and 7. In each of Figs. 5, 6 and 7 the axes of profile 118, yoke 22 (the primary axis) and profile 124 are shown, respectively, at the intersections of vertical phantom line 126 and horizontal top, center and bottom phantom lines 128, 130 and 132. Fig. 5 shows the rings as they would appear when the input-output speed ratio of the device is zero, races 42 and 44 being concentric with yoke 22. Fig. 6 shows the rings displaced from their zero positions in counterclockwise directions through angles of ninety degrees, the axes of races 42 and 44 being equidistant from and on diametrically opposite sides of the axis of yoke 22. And Fig. 7 shows the rings as they would appear when the input-output speed ratio of the device is maximum, the axes of races 42 and 44 being equidistant from and on diametrically opposite sides of the axis of yoke 22.

Figure 3:
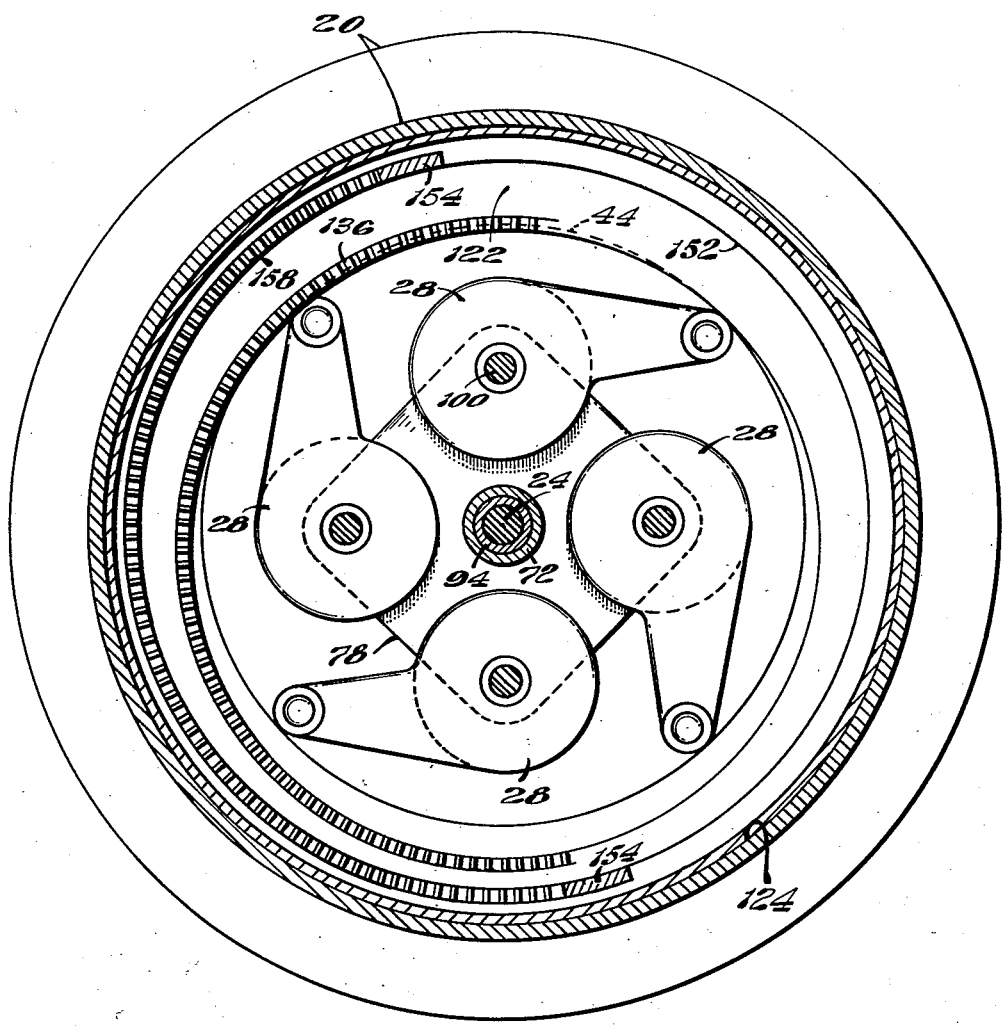
Fig. 3 is a cross-sectional view of the device taken substantially along the line 3—3 of Fig. 1.

In order that rings 116 and 122 be caused to rotate in the foregoing manner, ring 116 is provided with an arcuate rack 134, the axis of which is coincident with the axis of outer profile 118, and ring 122 is provided with an arcuate rack 136, the axis of which is coincident with the axis of outer profile 124. A control stem 138 which is mounted for rotation at the top of medial casting 46 carries a pinion 140 which is meshed with rack 134. An auxiliary stem 142 which is mounted for rotation at the bottom of medial casting 46 carries a pinion 144 which is meshed with rack 136. Interconnecting stem 138 and stem 142 are a pinion 146 which is carried by stem 138, a pinion 148 which is carried by stem 142, and a pair of rings 150 and 152, joined by a pair of ties 154 (Figs. 2 and 3) and seated in medial casting 46 for rotation in unison about the primary axis. Ring 150 is provided with an arcuate rack 156 which is meshed with pinion 146, and ring 152 is provided with an arcuate rack 158 which is meshed with pinion 148. It will be observed that as stem 138 is rotated, pinion 140 through rack 134 causes ring 116 to rotate as shown in Figs. 5, 6 and 7 and pinion 146 through rings 150 and 152, pinions 148 and 144 and rack 136 causes ring 44 to rotate as shown in Figs. 5, 6 and 7. The rotational limits of rings 116 and 122 are fixed by suitable stops (not shown).

The overall operation of the illustrated device will now be reviewed. When yoke 22 is caused to rotate, rocker arms 38 and 40 are caused by races 42 and 44, respectively, to oscillate, thereby, to cause the input members of clutches 26 and 28, respectively, to oscillate, and, thereby, to drive the output members of clutches 26 and 28 intermittently and unidirectionally. One-way clutches 26 and 28 are so arranged that as yoke 22 rotates, at least one output member of clutch 26 and at least one output member of clutch 28 rotate at any given time, and, consequently, output shaft 24 rotates continuously. The distances between the axes of races 42 and 44 and the axis of yoke 22, which distances determine the input-output speed ratio, are determined by the rotational positions of eccentric rings 116 and 122. These rotational positions may be varied by stem 138, its rotational position being varied either manually or remotely and either when the device is in operation or at rest.

Modifications of the illustrated embodiment of the present invention and alternative embodiments of the present invention, as will be apparent to persons skilled in the art, comprise various components and various relationships of components not disclosed specifically in the foregoing detailed description.

In one modification of the illustrated embodiment, additional sets of clutches and rocker arms and races with which they are associated are provided in order virtually to perfect the dynamic balance of the device and to more widely distribute the work load throughout the device.

In other modifications of the illustrated embodiment: rocker arms 38 and 40 are biased toward races 42 and 44 by springs; or the outer extremities of rocker arms 38 and 40 are pivotally connected to auxiliary rings which replace rollers 114 and 120 and which are rotatably mounted within races 42 and 44 by suitable ball or roller bearings.

In less preferred modifications of the illustrated embodiment: races 42 and 44 are defined by blocks which are adjustably mounted in the housing, for example, by screw gearing; or reciprocating plungers, which follow races 42 and 44 and which are geared to the input members of clutches 26 and 28, replace rocker arms 38 and 40.

In one of its broad aspects, the invention contemplates a variable speed device in which power is transmitted from an input yoke rotatable about a primary axis to an output shaft by rocker arms the inner ends of which are pivotable about axes fixed with respect to the yoke and which are spaced from the primary axis, by races which are followed by the outer ends of the rocker arms and which are so adjustable that their axes may be fixed between positions coincident with and spaced from the primary axis, and by one-way clutches which are in torque-receiving association with the rocker arms and which are in torque-transmitting association with the output shaft. In the illustrated embodiment, the outer clutch members are secured to the rocker arms and the inner clutch members are geared to the output shaft. In alternative embodiments of the invention, ones of the inner and outer clutch members are geared to the inner ends of the rocker arms and the others of the inner and outer clutch members are geared to the output shaft. In other alternative embodiments of the invention, ones of the inner and outer clutch members are geared to the inner ends of the rocker arms and the others of the inner and outer clutch members are keyed to the output shaft (and rotate about the same axis as does the output shaft).

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A variable speed device comprising a base, a yoke mounted for rotation on said base about a first axis, said yoke being adapted to receive an input torque, an output shaft mounted for rotation on said base, a plurality of races having second axes, said races being so adjustable on said base that said second axes are synchronously movable between positions coincident with and spaced from said first axis, a plurality of rocker arms pivotable about third axes fixed with respect to said yoke and spaced from said first axis, said rocker arms being adapted to follow said races, and a plurality of one-way clutches including clutch first members and clutch second members associated for rotation with respect to each other, said clutch first members being in torque receiving association with said rocker arms, said clutch second members being in torque transmitting association with said output shaft.

2. A variable speed device comprising a base, a yoke mounted for rotation on said base about a first axis, said yoke being adapted to receive an input torque, an output shaft mounted for rotation on said base, a plurality of eccentric rings each providing an inner profile and an outer profile, said inner profile having a second axis, said outer profile having a third axis parallel to and spaced from said second axis, each said eccentric ring being mounted for rotation on said base about said third axis whereby said second axis is movable between positions coincident with and spaced from said first axis, said eccentric rings being interconnected so as to rotate in synchronism with each other, rocker arms pivotable about axes fixed with respect to said yoke and spaced from said first axis, said rocker arms being constrained to follow said inner profiles of said rings, and a plurality of one-way clutches including clutch first members and clutch second members associated for rotation with respect to each other, said clutch first members being in torque receiving association with said rocker arms, said clutch second members being in torque transmitting association with said output shaft.

3. A variable speed device comprising a base, a yoke mounted for rotation on said base about a yoke axis, a plurality of pairs of one-way clutches, said one-way clutches including clutch first members and clutch second members, one each of said one-way clutches including one each of said clutch first members and one each of said clutch second members in association for rotation with respect to each other about a clutch axis, one of the members of one one-way clutch of each pair and one of the members of the other one-way clutch of each pair being mounted on said yoke for rotation in unison about said clutch axis and for orbital motion about said yoke axis, eccentric means having an eccentric axis parallel to said yoke axis, said eccentric means being adjustably mounted on said base so that said eccentric axis is movable with respect to said yoke axis, a plurality of actuating members operatively connected to said eccentric means and to ones of said clutch first members and said clutch second members, and output means mounted for rotation on said base and operatively connected to others of said clutch first members and said clutch second members.

4. An infinitely variable speed device comprising a base, a yoke mounted for rotation on said base about a yoke axis, a plurality of pairs of one-way clutches, said clutches including clutch first members and clutch second members, one each of said clutches including one each of said clutch first members and one each of said clutch second members in association for rotation with respect to each other about a clutch axis, one of the members of one clutch of each pair and one of the members of the other clutch of each pair being mounted on said yoke for rotation in unison about said clutch axis and for orbital motion about said yoke axis, a first eccentric having a first eccentric axis parallel to said yoke axis, a second eccentric having a second eccentric axis parallel to said yoke axis, said first eccentric and said second eccentric being adjustably mounted on said base so that said eccentric axes are movable with respect to said yoke axis between positions coincident with said yoke axis and positions spaced from said yoke axis, a plurality of pairs of actuating members, one actuating member of each pair being operatively connected to one of the members of one clutch of each pair and to said first eccentric, the other actuating member of each pair being operatively connected to one of the members of the other clutch of each pair and to said second eccentric, and output means mounted for rotation on said base and operatively connected to the others of the members of said clutches of said pair.

5. The device of claim 4 wherein said eccentric axes when not coincident with said yoke axis are on diametrically opposite sides thereof and equidistant therefrom.

6. A variable speed device comprising a base, a yoke mounted for rotation on said base about a primary axis, a plurality of one-way clutches including clutch inner members and clutch outer members associated for rotation with respect to each other, said clutch inner members and clutch outer members being mounted for rotation on said yoke and for orbital motion about said primary axis, a plurality of races having secondary axes parallel to said primary axis, said races being adjustably mounted on said base for synchronous movement of said secondary axes with respect to said primary axis, a plurality of actuating members operatively connected to said races and to ones of said clutch inner members and said clutch outer members, and output means mounted for rotation on said base and operatively connected to others of said clutch inner members and said clutch outer members.

7. An infinitely variable speed device comprising a base, yoke mounted for rotation on said base about a primary axis, a plurality of one-way clutches including clutch inner members and clutch outer members associated for rotation with respect to each other, said clutch inner members and said clutch outer members being mounted for rotation on said yoke and for orbital motion about said primary axis, a plurality of eccentric rings providing inner profiles and outer profiles, said inner profiles having a plurality of second axes parallel to said first axis, said outer profiles having a plurality of third axes parallel to and spaced from said second axes, said eccentric rings being mounted for rotation together on said housing about said third axes whereby said second axes are movable together between positions coincident with and spaced from said first axis, a plurality of rocker arms secured to said clutch outer members and disposed to follow said inner profiles, and output means mounted for rotation on said base and operatively connected to said clutch inner members.

8. A variable speed device comprising a base, a yoke mounted for rotation on said base about a first axis, a first set of one-way clutches including clutch first members and clutch second members associated for rotation with respect to each other, said clutch first members and clutch second members of said first set being mounted for rotation on said yoke and for motion in a first orbit about said primary axis, a second set of one-way clutches including clutch first members and clutch second members associated for rotation with respect to each other, said clutch first members and clutch second members of said second set being mounted for rotation on said yoke and for motion in a second orbit around said primary axis, a first eccentric ring providing an inner profile having a second axis parallel to said first axis and an outer profile seated on said base for rotation about a third axis parallel to said first axis, a first set of rocker arms secured to said clutch first members of said one-way clutches of said first set and constrained to follow said inner profile of said first eccentric ring, a second eccentric ring providing an inner profile having a fourth axis parallel to said first axis and an outer profile seated on said base for rotation about a fifth axis parallel to said first axis, a second set of rocker arms secured to said clutch first members of said one-way clutches of said second set and constrained to follow said inner profile of said second eccentric ring, a shaft mounted for rotation on said base, said clutch second members of said one-way clutches of said first and second sets being geared to said shaft, said third axis and said fifth axis being equidistant and on diametrically opposite sides of said first axis, the distance between said second and third axes being equal to the distances between said first and third axes, the distance between said fourth and fifth axes being equal to the distance between said first and fifth axes, and interconnecting means for rotating said first ring and said second ring at once, through the same angles in the same direction.

9. A variable speed device comprising a base, a yoke mounted for rotation on said base about a first axis, said yoke being adapted to receive an input torque, an output shaft mounted for rotation on said base, a plurality of races having second axes, said races being so adjustable on said base that said second axes are movable between positions coincident with and spaced from said first axis, said races being interconnected for predetermined movement with respect to each other, a plurality of rocker arms pivotable about third axes fixed with respect to said yoke and spaced from said first axis, said rocker arms being adapted to follow said races, and a plurality of one-way clutches including clutch first members and clutch second members associated for rotation with respect to each other, said clutch first members being in torque receiving association with said rocker arms, said clutch second members being in torque transmitting association with said output shaft.

10. A variable speed device comprising a base, a yoke mounted for rotation on said base about a first axis, said yoke being adapted to receive an input torque, an output shaft mounted for rotation on said base, at least two races having second axes, said two races being so adjustable on said base that said second axes are movable between positions coincident with and spaced from said first axis, means for maintaining said second axes of said two races equidistant from and on diametrically opposite sides of said first axis, a plurality of rocker arms pivotable about third axes fixed with respect to said yoke and spaced from said first axis, said rocker arms being adapted to follow said races, and a plurality of one-way clutches including clutch first members and clutch second members associated for rotation with respect to each other, said clutch first members being in torque receiving association with said rocker arms, said clutch second members being in torque transmitting association with said output shaft.

11. A variable speed device comprising a base, a yoke mounted for rotation on said base about a first axis, said yoke being adapted to receive an input torque, an output shaft mounted for rotation on said base, a plurality of races having second axes, said races being so adjustable on said base that said second axes are movable between positions coincident with and spaced from said first axis, said races being interconnected for predetermined movement relative to each other, a plurality of rocker arms pivotable about third axes fixed with respect to said yoke and spaced from said axes, rollers on said rocker arms, said rollers following said races under constraint from the centrifugal force of said rocker arms, and a plurality of one-way clutches including clutch first members and clutch second members associated for rotation with respect to each other, said clutch first members being in torque receiving association with said rocker arms, said clutch second members being in torque transmitting association with said output shaft.

12. A variable speed device comprising a base, a yoke mounted for rotation on said base about a first axis, said yoke being adapted to receive an input torque, an output shaft mounted for rotation on said base, a plurality of eccentric rings each providing an inner profile and an outer profile, said inner profile having a second axis, said outer profile having a third axis parallel to and spaced from said second axis, each said eccentric ring being mounted for rotation on said base about said third axis whereby said second axis is movable between positions coincident with and spaced from said first axis, rocker arms pivotable about axes fixed with respect to said yoke and spaced from said first axis, said rocker arms being constrained to follow the inner profiles of said rings, a plurality of one-way clutches including clutch first members and clutch second members associated for rotation with respect to each other, said clutch first members being in torque receiving association with said rocker arms, said clutch second members being in torque transmitting association with said output shaft, said first ring and said second ring being interconnected for simultaneous rotation through like angles.

13. A variable speed device comprising a base, a yoke mounted for rotation on said base about a first axis, said yoke being adapted to receive an input torque, an output shaft mounted for rotation on said base, at least two races having second axes, said two races being so adjustable on said base that said second axes are movable between positions coincident with and spaced from said first axis, means for maintaining said second axes equidistant from and on diametrically opposite sides of said first axis, a plurality of rocker arms pivotable about third axes fixed with respect to said yoke and spaced from said first axis, rollers on said rocker arms, said rollers following said races under constraint from the centrifugal force of said rocker arms, and a plurality of one-way clutches including clutch first members and clutch second members associated for rotation with respect to each other, said clutch first members being in torque receiving association with said rocker arms, said clutch second members being in torque transmitting association with said output shaft.

14. A variable speed device comprising a base, a yoke mounted for rotation on said base about a first axis, said yoke being adapted to receive an input torque, an output shaft mounted for rotation on said base, a plurality of eccentric rings each providing an inner profile and an outer profile, said inner profile having a second axis, said outer profile having a third axis parallel to and spaced from said second axis, each said eccentric ring being mounted for rotation on said base about said third axis whereby said second axis is movable between positions coincident with and spaced from said first axis, rocker arms pivotable about axes fixed with respect to said yoke and spaced from said first axis, rollers on said rocker arms, said rollers following the inner profiles of said rings under constraint from the centrifugal force of said rocker arms, a plurality of one-way clutches including clutch first members and clutch second members associated for rotation with respect to each other, said clutch first members being in torque receiving association with said rocker arms, said clutch second members being in torque transmitting association with said output shaft, said first and second ring being interconnected for simultaneous rotation through like angles.

References Cited in the file of this patent
UNITED STATES PATENTS

| | | |
|---|---|---|
| 1,178,923 | Johns | Apr. 11, 1916 |
| 1,624,835 | Joyner et al. | Apr. 12, 1927 |
| 2,159,739 | Johnson | May 23, 1939 |
| 2,256,903 | Hatcher | Sept. 23, 1941 |